(12) United States Patent
Birch et al.

(10) Patent No.: US 8,014,843 B2
(45) Date of Patent: Sep. 6, 2011

(54) MOBILE ELECTRONIC DEVICE

(75) Inventors: Magnus Birch, Malmö (SE); Mårten Lindqvist, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 478 days.

(21) Appl. No.: 12/228,645

(22) Filed: Aug. 14, 2008

(65) Prior Publication Data
US 2010/0041440 A1    Feb. 18, 2010

(51) Int. Cl.
*H04B 1/38* (2006.01)
(52) U.S. Cl. ............... 455/575.4; 455/90.3; 455/149; 455/569.1; 455/575.1
(58) Field of Classification Search ............. 455/90.3, 455/128, 149, 347–349, 350, 566, 569.1, 455/575.1, 575.4
See application file for complete search history.

(56) References Cited

U.S. PATENT DOCUMENTS

| | | | | |
|---|---|---|---|---|
| 6,453,045 B1 * | 9/2002 | Zurek et al. | ............... | 379/433.02 |
| 7,299,078 B2 * | 11/2007 | Ahn | ........................... | 455/575.4 |
| 7,738,931 B2 * | 6/2010 | Nitanda | ..................... | 455/575.4 |
| 7,756,286 B2 * | 7/2010 | Kim | ............................. | 381/388 |
| 2004/0023697 A1 | 2/2004 | Komura | | |
| 2006/0240881 A1 | 10/2006 | Cho et al. | | |
| 2007/0070189 A1 * | 3/2007 | Lee | ............................ | 348/14.16 |
| 2008/0049391 A1 | 2/2008 | Shin | | |
| 2009/0137293 A1 * | 5/2009 | Yoo et al. | ................... | 455/575.4 |

FOREIGN PATENT DOCUMENTS
WO    2006/011219 A1    2/2006
* cited by examiner

*Primary Examiner* — Cong Tran
(74) *Attorney, Agent, or Firm* — Peter F. Corless; Steven M. Jensen; Edwards Angell Palmer & Dodge LLP

(57) ABSTRACT

A mobile electronic device is provided with a housing, a loudspeaker, a cavity coupled to the loudspeaker, and a slide mechanism configured to move a portion of the housing between a first position and a second position. In the second position of the slide mechanism, an inner volume of the cavity is increased as compared to the first position.

12 Claims, 7 Drawing Sheets

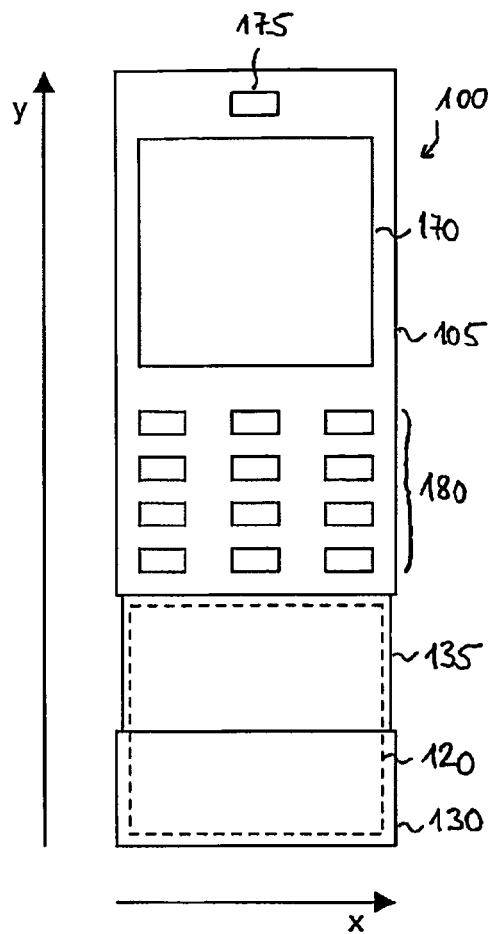
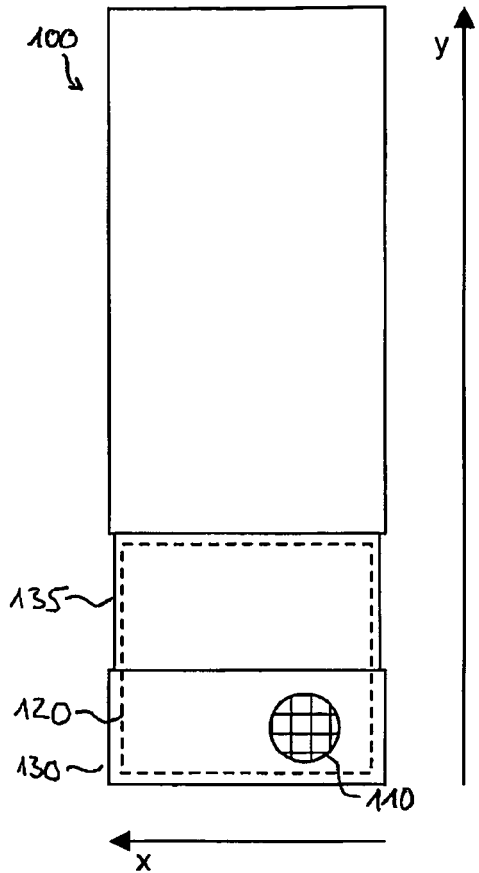
FIG. 2A
FIG. 2B
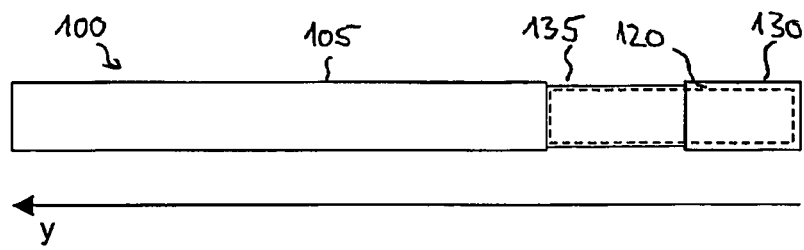
FIG. 2C

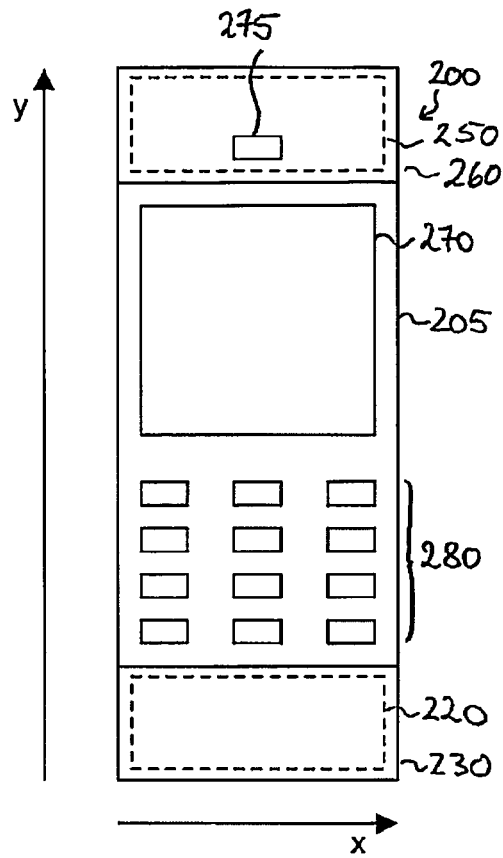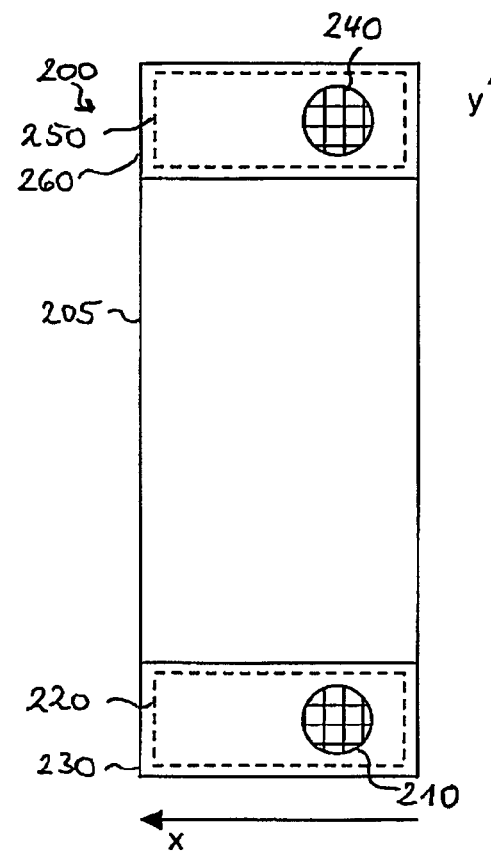
FIG. 3A    FIG. 3B
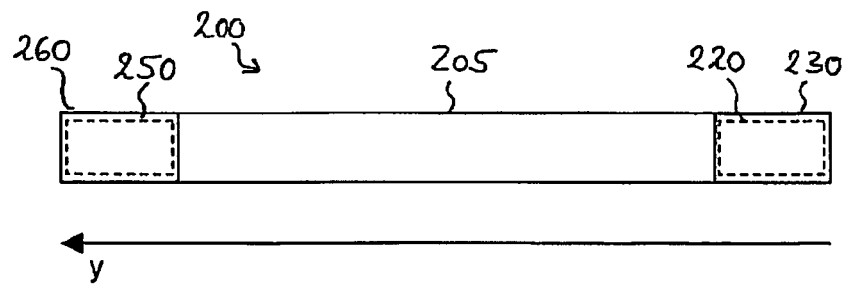
FIG. 3C

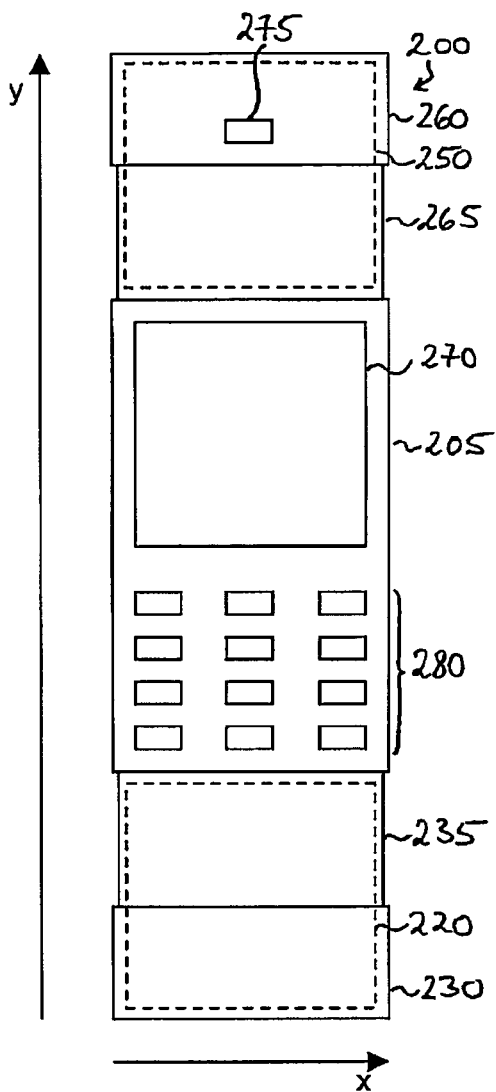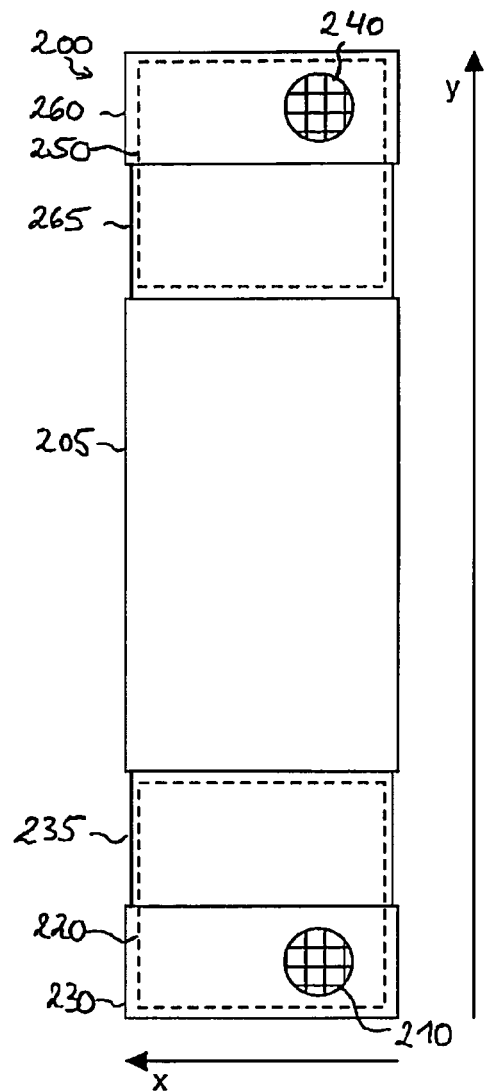
FIG. 4A          FIG. 4B
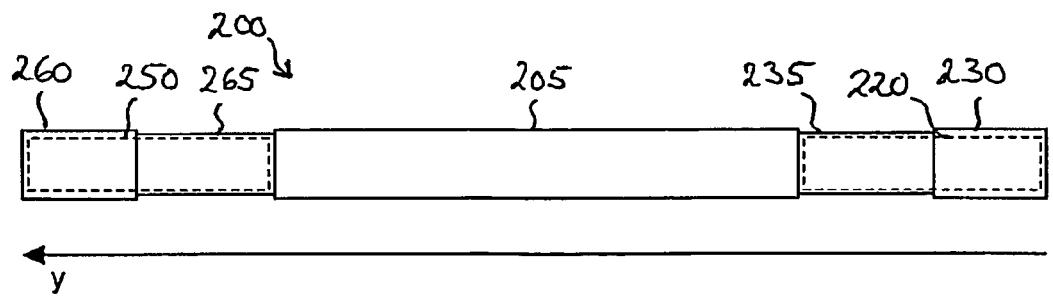
FIG. 4C

MOBILE ELECTRONIC DEVICE

FIELD OF THE INVENTION

The present invention relates to a mobile electronic devices. More particularly, the present invention relates to mobile electronic devices comprising at least one loudspeaker and a cavity coupled thereto.

BACKGROUND OF THE INVENTION

Recently, there has been a trend to provide small-sized mobile electronic devices with one or more loudspeakers so as to allow for the output of audio signals, e.g. music stored in a digital format. One example of such mobile electronic devices is a mobile phone equipped with an audio player functionality. By providing the mobile electronic device with at least one loudspeaker, it becomes possible to output an audio signal not only via externally connected output devices, such as earphones, but also directly from the mobile electronic device.

However, in small-sized mobile electronic devices there exist difficulties in obtaining a good output sound quality. This is due to the fact that in these small-sized mobile electronic device it is typically not possible to provide the loudspeaker with a sufficient resonance volume as the volume available in a housing of the mobile electronic device is limited. Typically, this results in a low sound pressure and sensitivity of the loudspeaker in the region of bass frequencies.

SUMMARY OF THE INVENTION

The present invention provides a mobile electronic device.

According to an embodiment of the invention, the mobile electronic device comprises a housing, a loudspeaker, a cavity coupled to the loudspeaker, and a slide mechanism to allow movement of a portion of the housing between a first position and a second position. In the second position of the slide mechanism, an inner volume of the cavity is increased as compared to the first position.

According to an embodiment of the invention, the mobile electronic device may comprise a keypad arranged in a keypad portion of the housing, the slide mechanism being arranged in the keypad portion of the housing.

According to an embodiment of the invention, the mobile electronic device may comprise a display arranged in a display portion of the housing, the slide mechanism being arranged in the display portion of the housing.

According to an embodiment of the invention, the mobile electronic device may comprise a further loudspeaker and a further cavity coupled to the further loudspeaker. In this embodiment, in the second position of the slide mechanism, the inner volume of the further cavity is increased as compared to the first position.

According to an embodiment of the invention, the mobile electronic device may comprise a further loudspeaker, a further cavity coupled to the further loudspeaker, and a further slide mechanism to allow movement of a further portion of the housing between a first position and a second position. In this embodiment, in the second position of the further slide mechanism, an inner volume of the further cavity is increased as compared to the first position.

According to an embodiment of the invention, the slide mechanism and the further slide mechanism may be configured to move the loudspeaker and the further loudspeaker in opposite slide directions when going from the first position to the second position.

In the above embodiments comprising a loudspeaker and a further loudspeaker, the loudspeaker and the further loudspeaker may be connected to a stereo signal source. Further, in the embodiments comprising a loudspeaker and a further loudspeaker, the loudspeaker and the further loudspeaker may be arranged in opposite portions of the housing.

According to an embodiment of the invention, the inner volume of the cavity or cavities in the second position of the slide mechanism or slide mechanisms is at least 4 $cm^3$.

According to an embodiment of the invention, a total inner volume of the housing in the first position of the slide mechanism is below 100 $cm^3$.

According to an embodiment of the invention, the mobile electronic device may comprise a locking mechanism configured to lock the slide mechanism in the first position and/or in the second position.

According to an embodiment of the invention, the mobile electronic device may comprise mobile communication circuitry disposed within the housing.

According to a further embodiment of the invention, a mobile electronic device comprises a first housing portion, a second housing portion, and a loudspeaker. The first housing portion and the second housing portion are moveable with respect to each other so as to increase the resonance volume of the loudspeaker.

Those skilled in the art will appreciate that features of the above-mentioned embodiments may be combined with each other as appropriate and new embodiments may be formed by combining one or more features of the above-mentioned embodiments of the invention.

The foregoing and other features and advantages of the invention will become further apparent from the following detailed description and the accompanying drawings.

BRIEF DESCRIPTION OF THE DRAWINGS

Embodiments of the present invention are illustrated by the accompanying figures, wherein:

FIGS. 2A, 2B, and 2C respectively show a schematic front view, a schematic rear view, and a schematic side view of the mobile electronic device of FIGS. 1A, 1B, and 1C in an extended state of a slide mechanism;

FIGS. 3A, 3B, and 3C respectively show a schematic front view, a schematic rear view, and a schematic side view of a mobile electronic device according to a further embodiment of the invention;

FIGS. 4A, 4B, and 4C respectively show a schematic front view, a schematic rear view, and a schematic side view of the mobile electronic device of FIGS. 3A, 3B, and 3C in an extended state of slide mechanisms of the mobile electronic device;

DETAILED DESCRIPTION OF THE INVENTION

Figure 1A:
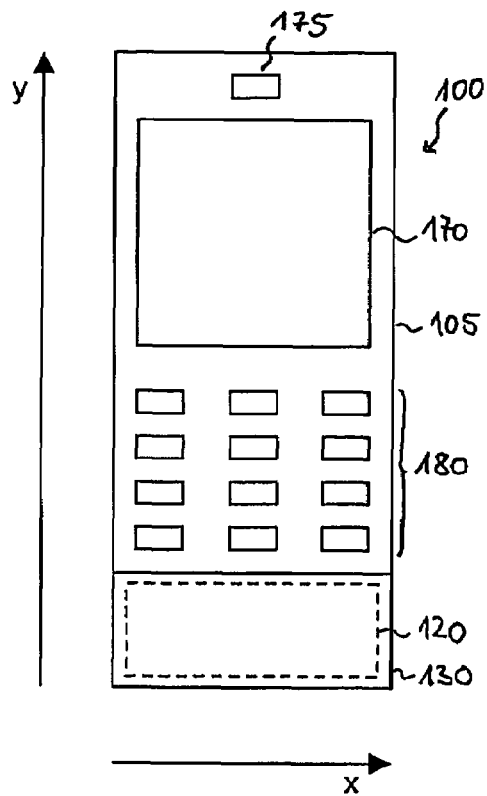
FIGS. 1A, 1B, and 1C respectively show a schematic front view, a schematic rear view, and a schematic side view of a mobile electronic device according to an embodiment of the invention.

In the following, embodiments of the present invention will be described with reference to the accompanying drawings. The described embodiments are intended to be merely exemplary and are not to be construed as limiting the scope of the present invention. It should be noted that in the drawings the elements are not necessarily to scale with each other, but have been depicted in a manner which allows for illustrating the features of the embodiments to a person skilled in the art. Any directional terminology in the following description, such as "left", "right", "up", "down", "rear", "front" or the like, is to be understood as being a reference to the way the embodiments are depicted in the drawings and not to be construed as limiting the scope of the present invention to the specific illustrated arrangements and the directional relationships of components.

In the following detailed description, embodiments of the present invention are described with relate to a mobile electronic device in the form of a mobile phone equipped with an audio player functionality. However, it is to be understood that the concepts described hereinafter could also be applied to other types of mobile electronic devices, such as media players, portable computers, or handheld video game consoles. It is to be understood that the details of electronic circuitry provided in the mobile electronic devices will depend on the type of application the mobile electronic device is intended for.

In the illustrated example, the housing has dimensions as typical for small-sized electronic device, i.e. has a total inner volume of below 100 $cm^3$. In typical embodiments, the total inner volume of the housing 105 is below 80 $cm^3$, or even below 60 $cm^3$ With the above-mentioned dimensions, the mobile electronic device can be provided with a compact format, which allows for convenient transportation and storage, e.g. in a bag or a pocket.

Figure 1B:
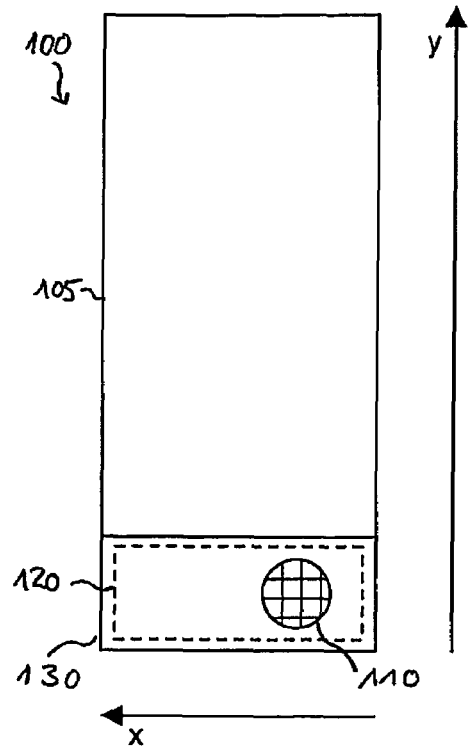
Figure 1C:
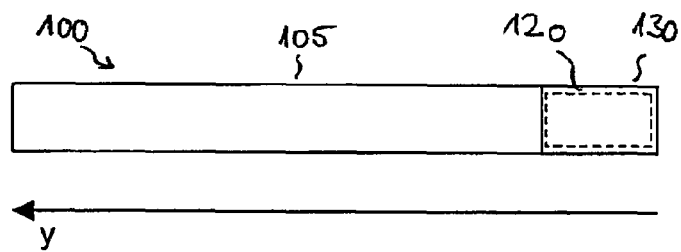

FIGS. 1A, 1B, 1C, 2A, 2B, and 2C schematically illustrate a mobile phone 100 according to an embodiment of the invention. A longitudinal direction of the mobile phone 100 is illustrated by arrow y, and a transversal direction of the mobile phone 100 is illustrated by arrow x. FIG. 1A is a front view of the mobile phone 100, FIG. 1B is a rear view of the mobile phone 100, and FIG. 1C is a side view of the mobile phone 100. FIG. 2A shows a front view of the mobile phone 100 in which a slide mechanism of the mobile phone 100 is in an extended second position, FIG. 2B shows a rear view of the mobile phone 100 in which the slide mechanism is in the extended second position, and FIG. 2C shows a side view of the mobile phone 100 in which the slide mechanism is in the extended second position.

As illustrated, the mobile phone 100 comprises a housing 105. In the illustrated example, the housing 105 has a substantially cuboid shape with long edges, medium edges and short edges. The long edges extend parallel to the y-direction, and the medium edges extend along the x-direction. The short edges extend along a direction perpendicular to both the x-direction and the y-direction. In other embodiments, the housing 105 of the mobile phone 100 may have a different shape. For example, the dimension along the x-direction may be same as the dimension along the y-direction or even larger, or the general shape may be different from substantially cuboid. Also, it is to be understood that the shape of the housing 105 may have rounded, chamfered or slanted edges.

In the housing 105, the mobile phone 100 comprises mobile communication circuitry, such as a radio transceiver, an antenna, a processor, a memory, a battery, or the like (not illustrated). Further, the mobile communication circuitry also comprises a display 170, a phone speaker 175, a keypad 180, and a microphone (not illustrated).

As further illustrated, the mobile phone 100 comprises a loudspeaker 110 arranged in a moveable portion 130 of the housing 105. The loudspeaker 110 allows for outputting an audio signal from the mobile phone 100, such as generated by an audio player function implemented by software running on the processor of the mobile phone 100. For example, audio data may be stored in digital format in a memory device of the mobile phone 100, and the audio player function may be configured to convert the digital audio data to an audio signal to be output by the loudspeaker 110. The loudspeaker 110 is arranged in a surface on the rear side of the housing 105, i.e. in the side opposite to the display 170 and the keypad 180.

The loudspeaker 110 may be of any suitable type to be installed in a mobile phone 100 or other small-sized electronic device. Typically, the loudspeaker 110 comprises at least one driver to which an electrical signal is supplied, and a diaphragm which separates a resonance volume from the outside environment of the mobile phone 100.

In the embodiment as illustrated in FIGS. 1A, 1B, and 1C, the resonance volume is formed by a cavity 120 arranged in the moveable portion 130 of the housing 105.

The mobile phone 100 is equipped with a slide mechanism which allows for moving the moveable portion 130 of the housing 105 between a first position as illustrated in FIGS. 1A, 1B, and 1C to a second position as illustrated in FIGS. 2A, 2B, and 2C.

As schematically illustrated in FIGS. 2A, 2B, and 2C, in the second position of the slide mechanism, the moveable portion 130 of the housing 105 is moved out from a main portion of the housing 105, thereby increasing the inner volume of the cavity 120. According to an embodiment, the inner volume of the cavity 120 is at least 4 $cm^3$ in the second position of the slide mechanism. In typical embodiments, the inner volume of the cavity 120 may be increased to more than 10 $cm^3$, e.g. about 12 $cm^3$.

By increasing the inner volume of the cavity 120, the quality of sound as output by the loudspeaker 110 is improved. In particular, the sound pressure level and the sensitivity of the loudspeaker, i.e. the sound pressure variation generated by a voltage variation of the electrical input signal of the loudspeaker 110, is increased. In typical embodiments, the sound pressure level in the bas frequency region may be increased by about 20 dB when the inner volume of the cavity 120 is increased from 1-2 $cm^3$ to about 12 $cm^3$.

In the embodiment as illustrated in FIGS. 1A, 1B, 1C, 2A, 2B, and 2C, the slide mechanism is formed in a keypad portion of the housing 105. That is to say, the moveable portion 130 of the housing 105 is configured to be slid out from the main portion of the housing 105 in a region in which the keypad 130 is located. In other embodiments, the slide mechanism may be formed in a different region of the housing 105, e.g. in a region in which the display 170 is located (i.e. in a display region).

As further illustrated in FIGS. 2A, 2B, and 2C, in the second position of the slide mechanism, surfaces of the moveable portion 130 of the housing 105 are exposed to the outside. According to some embodiments, these exposed surfaces 135 may be used for displaying information, e.g. by providing a symbol or a text which indicates that the mobile phone 100 operates in an enhanced bass mode.

Further, although in the illustrated example the loudspeaker 110 is illustrated to be arranged in a surface of the housing 105 which faces to the rear side, in other embodiments the loudspeaker 110 could be arranged in a surface of the housing 105 facing in a different direction, e.g. in the front direction, in the bottom direction, in the top direction, in the left side direction, or in the right side direction.

FIGS. 3A, 3B, 3C, 4A, 4B, and 4C schematically illustrate a mobile phone 200 according to a further embodiment of the present invention. In some aspects, the mobile phone 200 is similar to the mobile phone 100 as illustrated in FIGS. 1A, 1B, 1C, 2A, 2B, and 2C. For example, the housing 205 is generally similar to the housing 105, the loudspeaker 210 is generally similar to the loudspeaker 110, the cavity 220 is generally similar to the cavity 120, the moveable portion 230 of the housing 205 is generally similar to the moveable portion 130 of the housing 105, the display 270 is generally similar to the display 170, the phone speaker 275 is generally similar to the phone speaker 175, and the keypad 280 is generally similar to the keypad 180. In the following, it will be refrained from giving a repeated description of these components and only the differences of the mobile phone 200 as compared to the mobile phone 100 will be explained.

As illustrated in FIGS. 3A, 3B, 3C, 4A, 4B, and 4C, the mobile phone 200 comprises a further moveable portion 260 of the housing 205. In the illustrated example, the moveable portion 230 of the housing 205 is arranged at a bottom end portion, or keypad region, of the housing 205, and the further moveable portion 260 of the housing 205 is arranged at a top end portion, or display region, of the housing 205.

In the further moveable portion 260 of the housing 205, a further loudspeaker 240 is provided. In addition, also a further resonance volume of the further loudspeaker 240 is provided in the form of a further cavity 250. A further slide mechanism is provided which allows for sliding out the further moveable portion 260 of the housing 205 from a main portion of the housing 205 so as to increase the inner volume of the further cavity 250. The loudspeaker 210 and the further loudspeaker 240 are provided in a surface on the rear side of the housing 205. Further, in the illustrated example the loudspeaker 210 and the further loudspeaker 240 are located at opposite portions of the housing 205, i.e. at the bottom portion and the top portion. This is beneficial with respect to the output of stereo signals.

According to an embodiment, the loudspeaker 210 and the further loudspeaker 240 are configured for the output of a stereo signal and are connected to a stereo signal source. For example, the loudspeaker 210 may output signals of a left stereo channel, and the loudspeaker 240 may output signals of a right stereo channel or vice versa.

According to an embodiment, the further loudspeaker 240 has a configuration substantially similar to the loudspeaker 210, and the further cavity 250 may have an inner volume which, at least in the second position of the slide mechanisms, is substantially the same as the inner volume of the cavity 220. According to some embodiments, the inner volume of the cavity 220 and 250 may be substantially the same also in the first position of the slide mechanisms.

As further illustrated, also in case of the mobile phone 200 the moveable portions 230, 260 of the housing 205 comprise surfaces 235, 265 which are hidden in the first position of the slide mechanisms, but are exposed to the outside in the second position of the slide mechanisms. Again, these surfaces 235, 265 may be used for carrying information in the form of symbols or text or the like.

As further illustrated, in the extended second positions of the slide mechanisms of the mobile phone 200, the loudspeakers 210, 240 are spaced further apart from each other than in the first position of the slide mechanisms. In particular, a slide direction of the slide mechanism for sliding out the moveable portion 230 is opposite to a slide direction of the slide mechanism for sliding out the moveable portion 260. In this way, not only the sound quality is improved due to an increased resonance volume of the loudspeakers 210, 240, but also the spatial separation of stereo channels is improved.

Also in case of the embodiment as illustrated in FIGS. 3A, 3B, 3C, 4A, 4B, and 4C, it is to be understood that the loudspeakers 210, 240 could also be provided in other surfaces of the housing 205 than the rear surface. For example, the loudspeaker 210 could be provided in a front surface, a bottom surface, a left side surface, or a right side surface of the housing 205, and the loudspeaker 240 could be provided in a front surface, a top surface, a left side surface, or a right side surface of the housing 205.

Figure 5A:
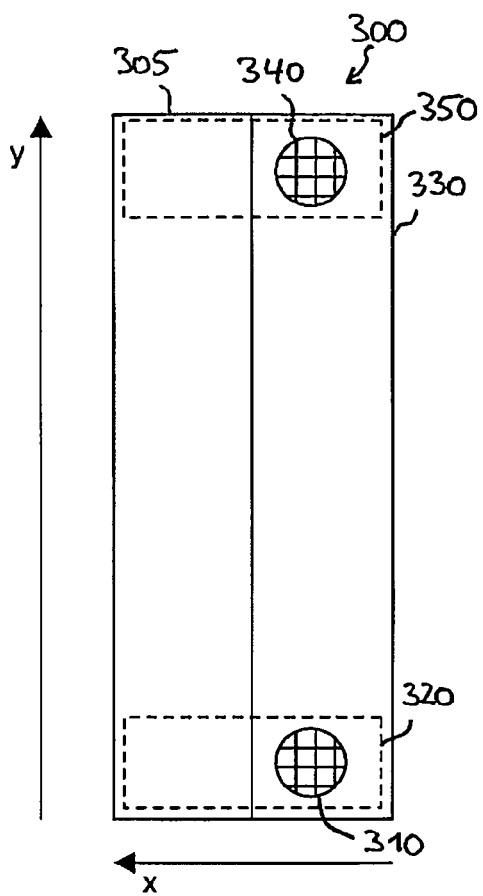
FIG. 5A shows a schematic rear view of a mobile electronic device according to a further embodiment of the invention.
Figure 5B:
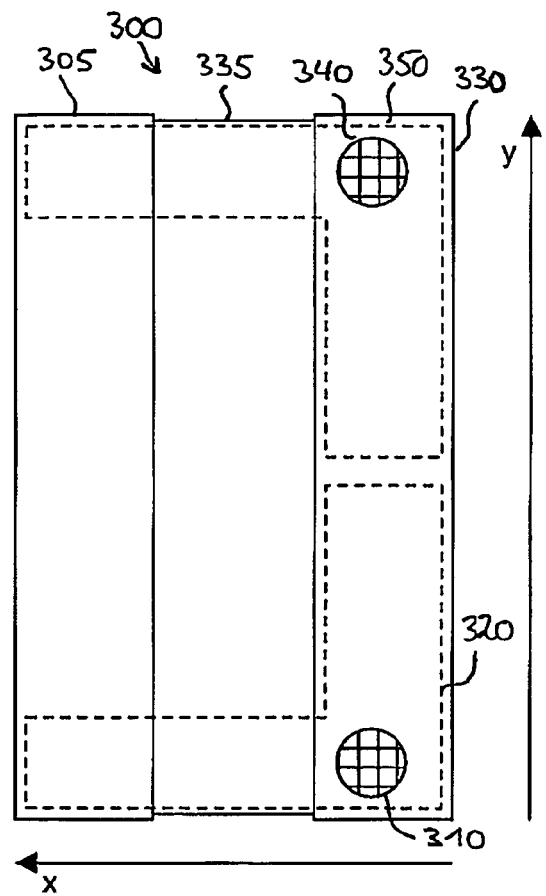
FIG. 5B shows a schematic rear view of the mobile electronic device of FIG. 5A in an extended state of a slide mechanism of the mobile electronic device.

FIGS. 5A and 5B schematically illustrate a mobile phone 300 according to a further embodiment of the invention. In particular, FIGS. 5A and 5B illustrate rear views of the mobile phone 300. Elements on the front side of the mobile phone 300 may be same as those illustrated for the mobile phones 100 and 200. Further, the general structure of the mobile phone 300 may be similar to the general structure of the mobile phone 200. That is to say, the mobile phone 300 may comprise a housing 305 which is generally similar to the housing 205 of the mobile phone 200, a loudspeaker 310 which is generally similar to the loudspeaker 210 of the mobile phone 200, a further loudspeaker 340 which is generally similar to the further loudspeaker 240 of the mobile phone 200, and cavities 320, 350 which are generally similar to the cavities 220, 250 of the mobile phone 200. In the following, only the differences of the mobile phone 300 as compared to the mobile phone 200 will be explained.

As illustrated in the Figures, the mobile phone 300 comprises a single moveable portion 330 of the housing 305 for both loudspeakers 310, 340. The moveable portion 330 of the housing 305 can be slid out of a main portion of the housing 305 in the transversal direction, i.e. parallel to the x-direction, so as to increase the inner volume of both the cavity 320 and the further cavity 350. that is to say, the mobile phone 300 comprises a single slide mechanism which allows for increasing the resonance volume of both the loudspeaker 310 and the loudspeaker 340.

In the example as illustrated in FIGS. 5A and 5B, the moveable portion 330 of the housing 305 extends all along the longitudinal dimension of the mobile phone 300, which allows for a comparatively large increase of the resonance volume in relation to the relative displacement of the moveable portion 330 with respect to the main portion of the housing 305. Accordingly, the resonance volume of the loudspeakers 310, 340 can be increased in a very efficient manner.

Also in case of the embodiment as illustrated in FIGS. 5A and 5B, it is to be understood that the loudspeakers 310 and 340 could be located on different surfaces of the housing 305. For example, the loudspeaker 310 could be located on a front surface, a bottom surface, a left-side surface or a right-side surface of the housing 305, and the loudspeaker 340 could be located on a front surface, a top surface, a left side surface or a right side surface of the housing 305.

Figure 6A:
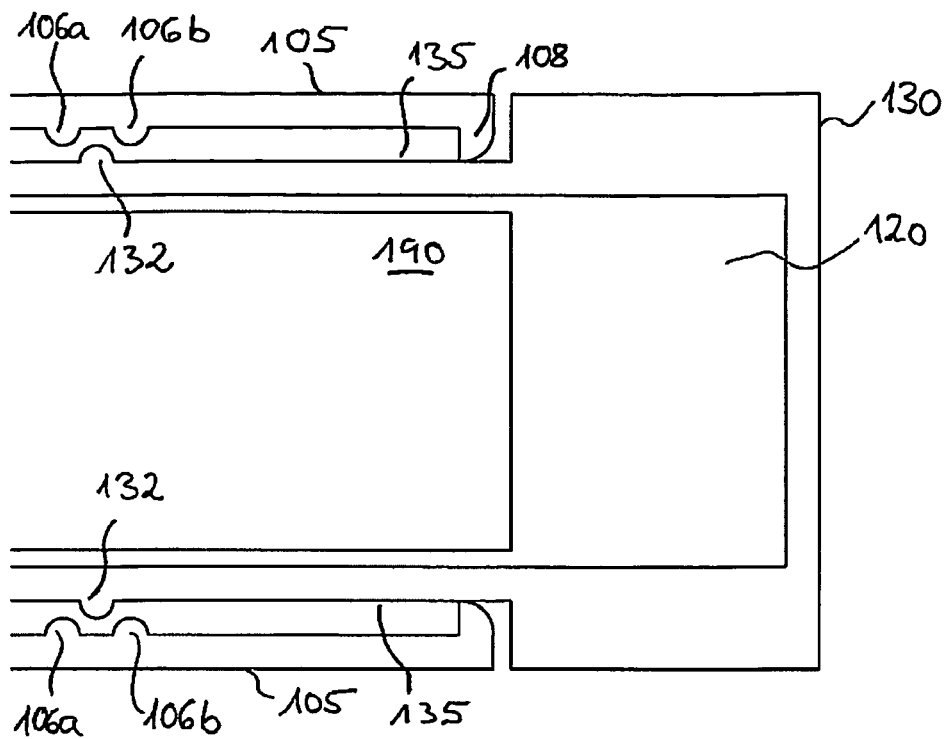
FIGS. 6A and 6B schematically illustrate the structure and operation of a slide mechanism implemented in a mobile electronic device according to an embodiment of the invention.
Figure 6B:
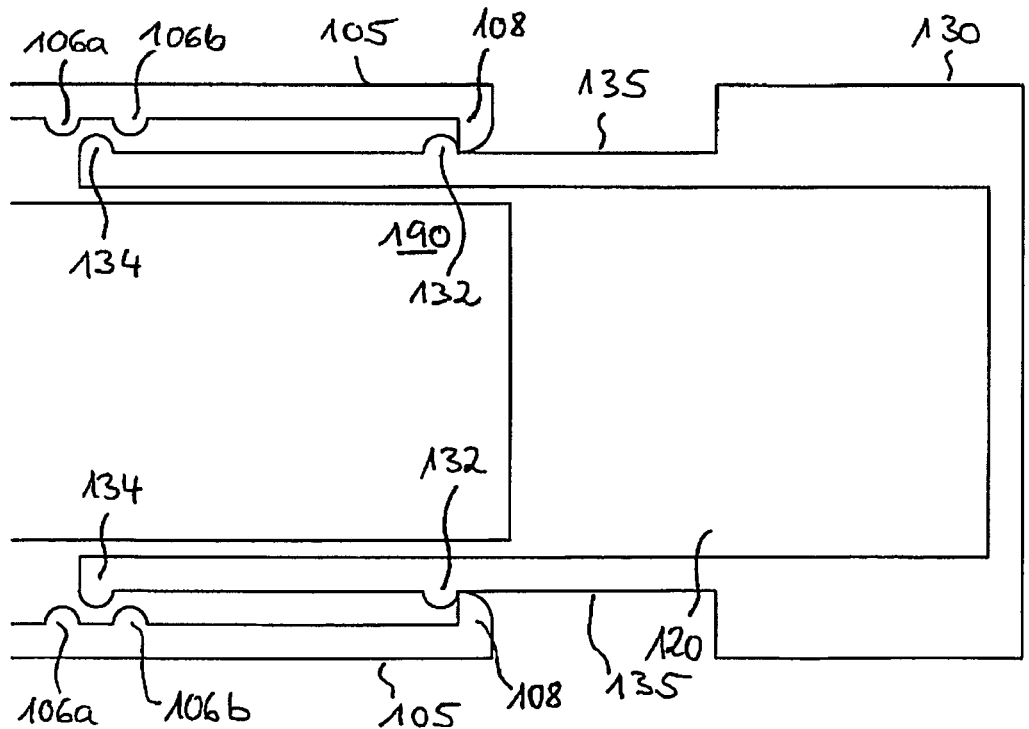

In FIGS. 6A and 6B, the structure and operation of an exemplary implementation of a slide mechanism according to an embodiment of the invention is illustrated. The slide mechanism is illustrated in connection with the moveable portion 130 of the housing 105 as illustrated in FIGS. 1A, 1B, 1C, 2A, 2B, and 2C for the mobile phone 100. However, it is to be understood that this exemplary implementation of a slide mechanism could also be applied in connection with the moveable portion 230, 260 of the housing 205 as illustrated in FIGS. 3A, 3B, 3C, 4A, 4B, and 4D for the mobile phone 200, or in connection with the moveable portion 330 of the housing 305 as illustrated in FIGS. 5A and 5B for the mobile phone

300. FIGS. 6A and 6B correspond to partial sectional views of the mobile phone 100 parallel to the y-direction and perpendicular to the x-direction.

In FIG. 6A, the slide mechanism for sliding out the moveable portion 130 of the housing 105 out from the main portion of the housing 105 is illustrated in its non-extended first position, and in FIG. 6B the slide mechanism is illustrated in its extended second position.

As illustrated, the moveable portion 130 of the housing 105 is received within the main portion of the housing 105 in a telescopical manner. In the first position as illustrated in FIG. 6A, a part of the moveable portion is fully received within the main portion of the housing 105. Components located inside the main portion of the housing 105, e.g. schematically illustrated mobile communication circuitry 190, is located within both the main portion of the housing 105 and the moveable portion 130.

In the illustrated implementation, the slide mechanism comprises a locking mechanism for locking the slide mechanism in its first position and in its second position. The locking mechanism is formed by a pair of internal ridges 106a, 106b formed on the inner surface of the main portion of the housing 105, a first ridge 132 formed on the outer surface 135 of the moveable portion 130 to be received within the main portion of the housing 105, and a second outer ridge formed on the outer surface 135 of the moveable portion 130 to be received within the main portion of the housing 105.

The pair of inner ridges 106a, 106b are closely spaced from each other, at a distance substantially corresponding to the width of the outer ridges 132, 134. In the first position of the slide mechanism, the first outer ridge 132 engages between the pair of inner ridges 106a, 106b. Accordingly, the slide mechanism is locked in the first position. For bringing the slide mechanism from the first position to the second position, a user has to exert a force pulling out the moveable portion 130 from the main portion of the housing 105 which, due to elastic properties of the housing 105, allows to move the first outer ridge 132 over the inner ridge 106b, thereby releasing the engagement. The moveable portion 130 of the housing 105 can then be moved at low resistance until the second outer ridge 134 reaches the inner ridge 106a. By applying a suitable force to the moveable portion 130, the second outer ridge 134 can be moved past the inner ridge 106a so as to be engaged between the inner ridges 106a, 106b. The slide mechanism is then locked in its second position.

As further illustrated, the slide mechanism is also equipped with an abutment which avoids that the moveable portion 130 is fully pulled out from the main portion of the housing 105 and eventually released. In the illustrated example, the abutment is formed by a hook-like inner shoulder 108 provided on the inner surface of the main portion of the housing 105. As illustrated in FIG. 6B, in the second position of the slide mechanism, the first outer ridge 132 comes into abutment with the inner shoulder 108, thereby preventing that the moveable portion 130 is further pulled out from the main portion of the housing 105.

As further illustrated, the locking mechanism comprising the outer ridges 132, 143 and the pair of inner ridges 106a, 106b and the abutment comprising the outer ridge 132 and the inner shoulder 108 can be formed on both the front side of the mobile phone 100 and on the bottom side of the mobile 100. In other embodiments, a locking mechanism and/or an abutment may be formed on only one of the front side and the rear side. Further, it is also possible to implement a locking mechanism and/or an abutment on the left side and/or the right side of the mobile phone 100. The same applies to locking mechanism and abutments used for the slide mechanism of the mobile phone 200. In case of the mobile phone 300, it is also possible to implement a locking mechanism and/or an abutment on the top side and/or on the bottom side of the mobile phone 300.

In other embodiments, other implementations of a locking mechanism and an abutment may be used. For example, alternative locking mechanisms and abutments may be implemented on the basis of any suitable combination of ridges, shoulders, grooves, or the like. Also, it is possible to provide for locking of the slide mechanism in more than two positions, e.g. in a non-extended first end position, in an intermediate position, and in an extended second end position.

Figure 7:
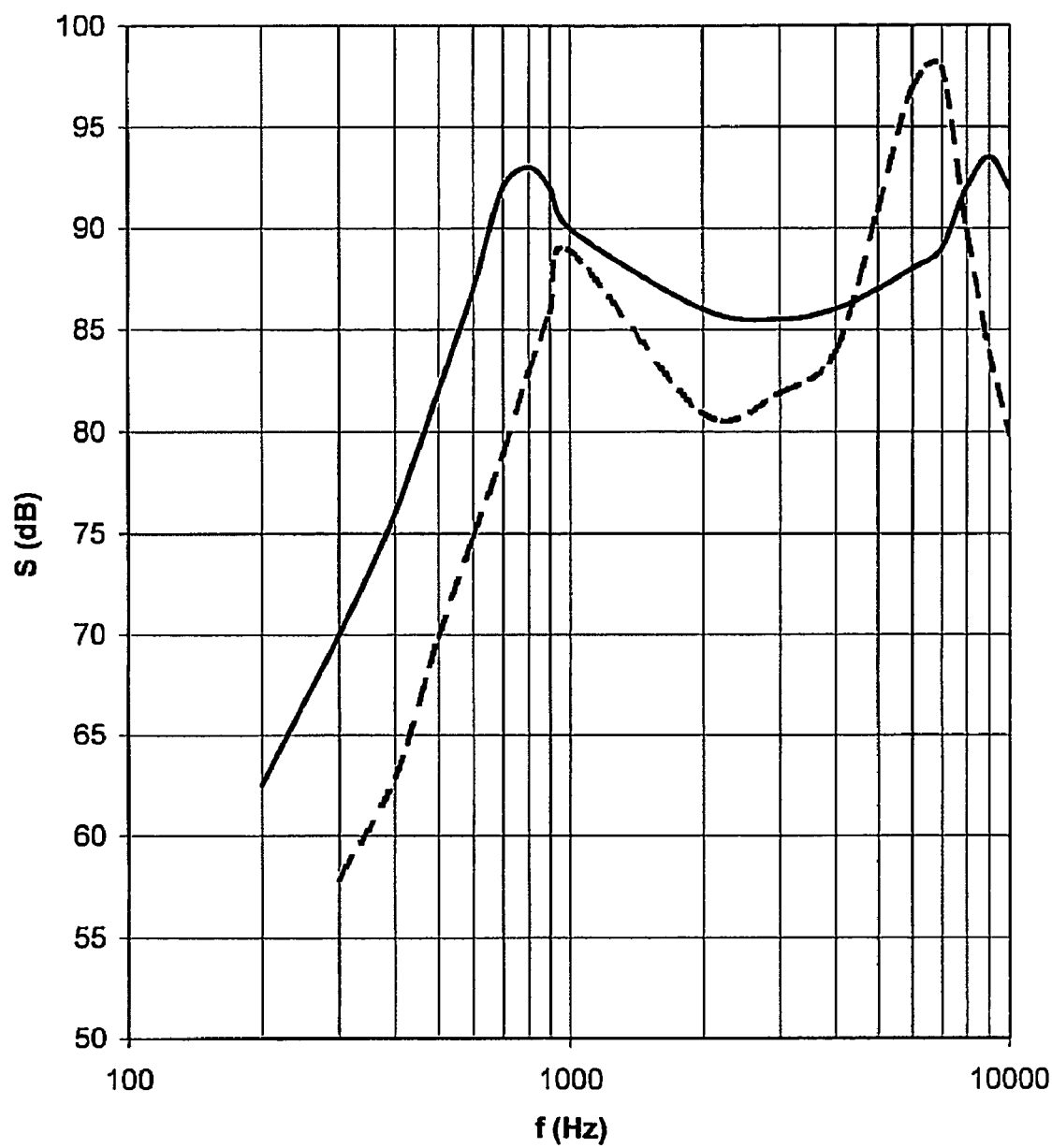
FIG. 7 shows exemplary frequency responses of loudspeakers as measured for different cavity volumes.

FIG. 7 shows exemplary frequency responses of loudspeakers for illustrating the concepts of the above embodiments. In FIG. 7, the sound pressure S (in dB) is shown as a function of the frequency f (in Hz). The dashed line shows the frequency response of an exemplary loudspeaker with a resonance volume of about 2 $cm^3$. The solid line shows the frequency response of the same loudspeaker with a resonance volume of about 12 $cm^3$. As can be seen, the frequency response in the low frequency range below 1000 Hz (i.e. in the bass frequency range) is significantly improved. An increase of the sound pressure level of about 20 dB can be obtained in this frequency range, which means about three times higher experienced sound pressure level. Accordingly, the embodiments as explained above allow for a significant improvement of the sound quality.

As a matter of course, the above-described embodiments are merely exemplary and various modifications are possible without departing from the scope of the present invention. For example, features of the above embodiments could be combined with each other as appropriate. For example, the slide mechanism of FIGS. 5A and 5B, in which the moveable portion of the housing is slid out in a transversal direction of a mobile phone, could also be combined with a single loudspeaker as illustrated in FIGS. 1A, 1B, 1C, 2A, 2B, and 2C. Further, it is possible to implement the embodiments as illustrated in FIGS. 1A, 1B, 1C, 2A, 2B, 2C, 3A, 3B, 3C, 4A, 4B, and 4C with a transversal slide direction rather than with a longitudinal slide direction. Further, it is also possible to combine the illustrated slide mechanisms for increasing the resonance volume of a loudspeaker with other slide mechanisms of a mobile electronic device, e.g. with a slide mechanism for hiding portions of a keypad. Also, the slide mechanisms may be implemented in such a way that the loudspeaker is attached to the main portion of the housing rather than to the moveable portion of the housing which means that the loudspeaker is not moved together with the moveable portion of the housing. The concepts of the above embodiments may also be combined with techniques of optimizing the sound quality, e.g. by optimizing the shape of the resonance volume. In some embodiments, the cavities for providing a resonance volume may be closed cavities. In other embodiments, partially open cavities may be used, e.g. cavities provided with a vent or a bass reflex port.

Accordingly, numerous modifications and variants are accessible to persons skilled in the art, and the scope of the present invention is therefore intended to be defined only be the appended claims and equivalents thereof.

What is claimed is:

1. A mobile electronic device, comprising:
   a housing;
   a loudspeaker;
   a cavity coupled to the loudspeaker;
   a slide mechanism to allow movement of a portion of the housing between a first position and a second position; and
   a keypad arranged in a keypad portion of the housing,
   wherein in the second position of the slide mechanism an inner volume of the cavity is increased as compared to the first position, and
   the slide mechanism is arranged in the keypad portion of the housing.

2. The mobile electronic device according to claim 1, wherein in the second position of the slide mechanism the inner volume of the cavity is at least 4 cm$^3$.

3. The mobile electronic device according to claim 1, wherein in the first position of the slide mechanism a total inner volume of the housing is below 100 cm$^3$.

4. The mobile electronic device according to claim 1, comprising:
   a locking mechanism configured to lock the slide mechanism in the first position and/or in the second position.

5. The mobile electronic device according to claim 1, comprising:
   mobile communication circuitry disposed within the housing.

6. A mobile electronic device comprising:
   a housing;
   a loudspeaker;
   a cavity coupled to the loudspeaker;
   a slide mechanism to allow movement of a portion of the housing between a first position and a second position;
   a further loudspeaker; and
   a further cavity coupled to the further loudspeaker,
   wherein in the second position of the slide mechanism inner volumes of the cavity and the further cavity are increased as compared to the first position.

7. The mobile electronic device according to claim 6, wherein the loudspeaker and the further loudspeaker are connected to a stereo signal source.

8. The mobile electronic device according to claim 6, wherein the loudspeaker and the further loudspeaker are arranged in opposite portions of the housing.

9. A mobile electronic device, comprising:
   a housing;
   a loudspeaker;
   a cavity coupled to the loudspeaker;
   a slide mechanism to allow movement of a portion of the housing between a first position and a second position;
   a further loudspeaker;
   a further cavity coupled to the further loudspeaker; and
   a further slide mechanism to allow movement of a further portion of the housing between a first position and a second position,
   wherein in the second position of the further slide mechanism inner volumes of the cavity and the further cavity are increased as compared to the first position.

10. The mobile electronic device according to claim 9, wherein the loudspeaker and the further loudspeaker are connected to a stereo signal source.

11. The mobile electronic device according to claim 9, wherein the loudspeaker and the further loudspeaker are arranged in opposite portions of the housing.

12. The mobile electronic device according to claim 9, wherein the slide mechanism and the further slide mechanism are configured to move the loudspeaker and the further loudspeaker in opposite directions when going from the first position to the second position.

* * * * *